United States Patent [19]

Haanen

[11] Patent Number: 4,829,925
[45] Date of Patent: May 16, 1989

[54] MULTIPLE MODE SAIL DRIVEN VEHICLE

[76] Inventor: Donald R. Haanen, 1719 Gross Ave., Green Bay, Wis. 54304

[21] Appl. No.: 145,306

[22] Filed: Jan. 19, 1988

[51] Int. Cl.⁴ .............................................. B62B 15/00
[52] U.S. Cl. ..................................... 114/39.1; 114/43; 114/283
[58] Field of Search ...................... 114/39.1, 140, 141, 114/43, 283, 274, 279, 272; 280/16

[56] References Cited

U.S. PATENT DOCUMENTS

| | | | |
|---|---|---|---|
| 2,238,464 | 4/1941 | Fletcher | 114/43 |
| 3,139,057 | 6/1964 | Black | 114/43 |
| 3,291,088 | 12/1966 | Klose | 114/39.1 |
| 3,547,065 | 12/1970 | Chauveau | 114/141 |
| 4,061,100 | 12/1977 | Muhlfeld | 114/43 |
| 4,498,683 | 2/1985 | Johann | 114/43 |

Primary Examiner—Sherman D. Basinger
Assistant Examiner—Edwin L. Swinehart
Attorney, Agent, or Firm—Richard C. Litman

[57] ABSTRACT

A sailboat, adaptable to use in water, on land and on ice or snow, having a longitudinal beam support extending outwardly in front of the bow and engageable with the bow of the hull structure. The hull structure also having a mounted airfoil support member extending transversely across the aft portion of the sailboat. The longitudinal beam support and the airfoil support member being adaptable to a skate element mounted on the outer reaches of the support members and/or to the mounting thereon of wheel elements that provides the vessel with a means of locomotion. The support members being braced or tensioned at the outer reaches thereof by guy wires extending therebetween to orient and align the support members and brace same in relation to the hull structure of the sailboat. The hull structure also has a keel housing member integral therewith, a centerboard keel member being slidably disposed within the keel housing member. The centerboard keel member has a weighted hydrofoil element attached to it that provides the sailing craft with a lift coefficient as it is underway in water and, being weighted, the hydrofoil element also lowers the center of gravity for the sailboat.

13 Claims, 6 Drawing Sheets

MULTIPLE MODE SAIL DRIVEN VEHICLE

FIELD OF INVENTION

The present device relates to a sailboat that is convertible from use in water to use on land and to use on ice or snow. More particularly, the invention relates to a monohull sailing craft having the capability of quickly and conveniently converting from one mode of use to another. In this conversion, attachments are used to render the craft usable on land and ice or snow. These attachments include a longitudinal support beam and a transversely mounted airfoil support member, that function to lift the hull of the vessel free of surface level, provide necessary clearance and to effect a transition from water sailing to land, ice or snow sailing.

BACKGROUND TO THE INVENTION

Sailing is one of the most popular sports in the country and sailing craft are used not only for water sailing, but also are outfitted with a variety of gear for converting into land, ice or snow sailing craft. The present invention relates to an improvement in the multiple mode sailing craft and especially to a means for achieving greater speeds while the craft is waterborne and for achieving higher strength to weight ratios, and greater stability, while the craft is being utilized in a land sailing or in an ice or snow sailing mode of operation.

The present invention also relates to a means for increasing the stability of the sailboat in the water, while the craft is underway and further to a means for lowering the center of craft, approximately in the center of the craft, so as to increase the righting arm or momentum of righting as the craft heels with the wind. The craft being adaptable to light air or heavy weather conditions.

The use of adjustable shrouds in the rigging of the sailboat relates to a means of also increasing the speed of the vessel in all modes of travel.

This invention further relates to a means for pivotably rotating a rudder element upwardly so as to provide clearance under the craft in shallow water or for putting on a trailer.

This device also relates to a means of organizing the cockpit of the sailboat so as to present a control means, by which a steering means outboard of the bowsprit, may be manipulated by the occupant of the craft, for the easy and convenient control of the craft when in a land mode or ice or snow mode of travel.

SUMMARY OF THE PRIOR ART

The following cited references are found to be exemplary of the prior art.

| U.S. Pat. No. | Inventor |
|---|---|
| 2,238,464 | Fletcher |
| 4,512,275 | Drumm |

U.S. Pat. No. 2,238,464, issued to Fletcher, discloses a convertible sailing vessel comprising a vessel which may be adapted for sailing on water, for sailing on ice or for sailing on land and another object of the invention is to provide a sailing vessel having three mobile points of support and foldable into relatively small space.

U.S. Pat. No. 4,512,275, issued to Drumm, teaches the construction of an unsinkable all-purpose boat designed for pleasure or survival and may be adapted for use on ice and snow, and may be further adapted for use on dry land, by the employment of wheels.

U.S. Pat. Nos. 3,691,976 and 4,512,275 disclose various sailing craft and combined land and water vehicles, but none of the prior art references, taken singly or in combination disclose the specific features of the present invention in any way so as to bear upon the claims as appended hereto.

SUMMARY OF THE INVENTION

An object of the present invention is to provide a sailboat having means for quickly converting from water sailing to land or ice or snow sailing modes of travel, while retaining hull structural integrity thus eliminating or minimize water access into the hull structure itself.

Another object of the present invention is to provide a convenient organization to the cockpit of the sailboat so as to arrange the elements of control convenient for the use thereof.

Another object provides an adjustable shroud rigging in combination with a two position centerboard keel member to increase the speed and stability of the sailboat underway in water.

A further object is to provide means for removably affixing various means of locomotion, such as wheel elements or ski elements to the sailboat support members to effect a change in the mode of travel.

A still further object is to provide a means for pivotably displacing a rudder element upwardly to swing it free for shallow water maneuvering.

DESCRIPTION OF THE PREFERRED EMBODIMENT

Figure 1:
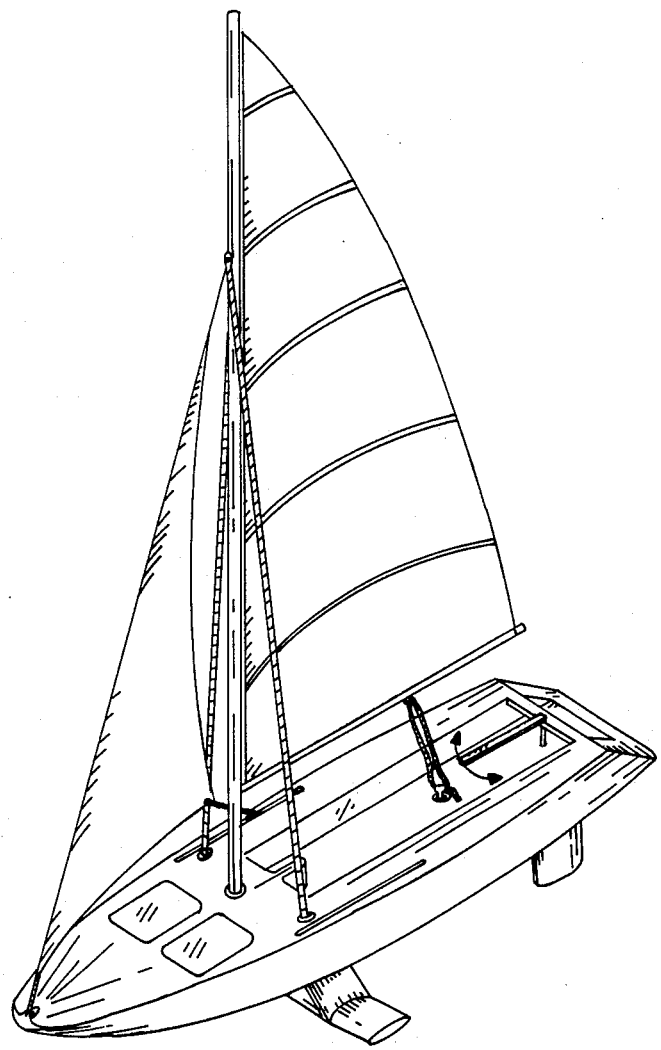
FIG. 1 is a perspective view of the sailboat illustrating a centerboard member that has a hydrofoil element transversely deployed on the bottom portion of the centerboard member.
Figure 2:
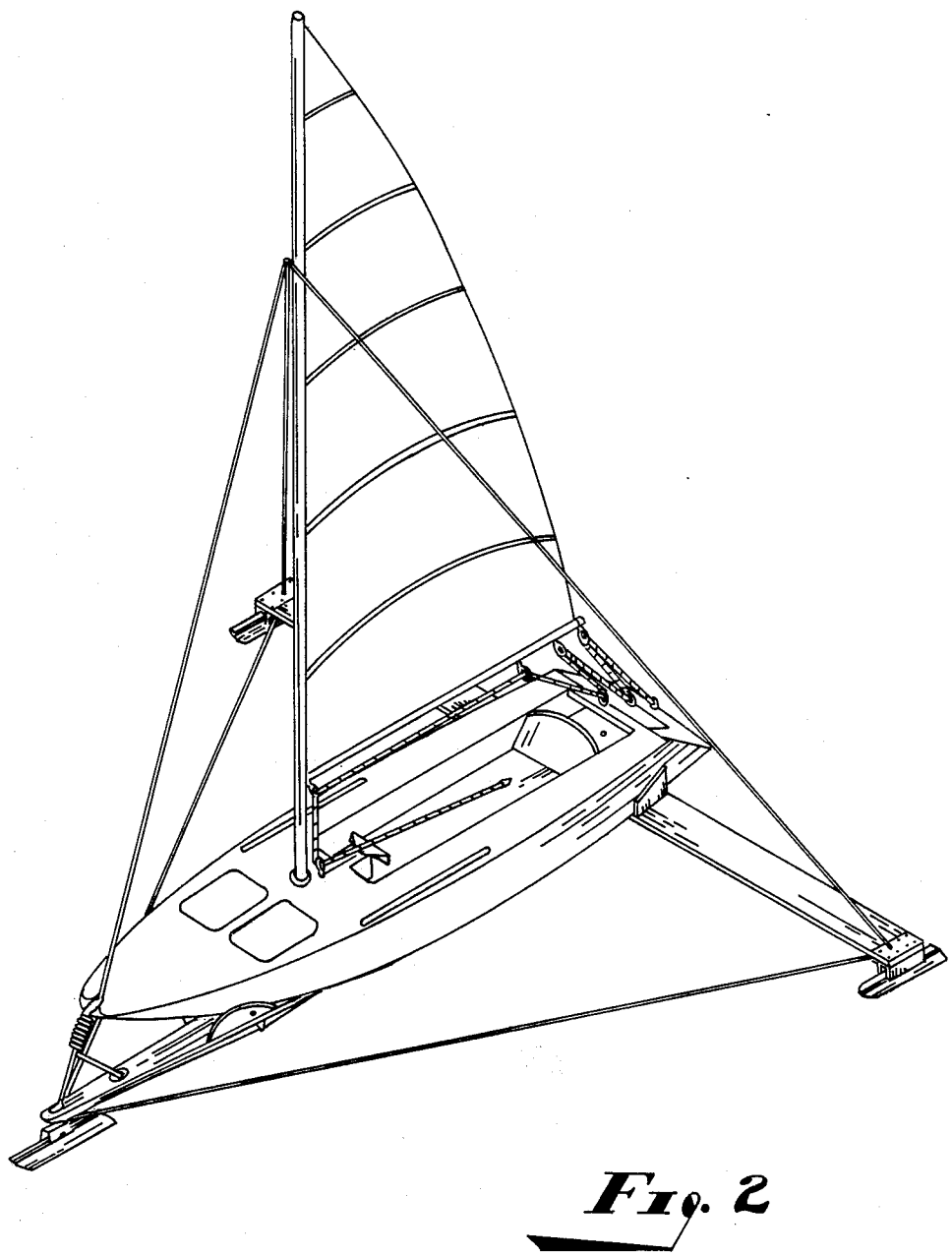
FIG. 2 is a perspective view of the sailboat that illustrates an adaptation of the sailboat for use on ice or snow.
Figure 3:
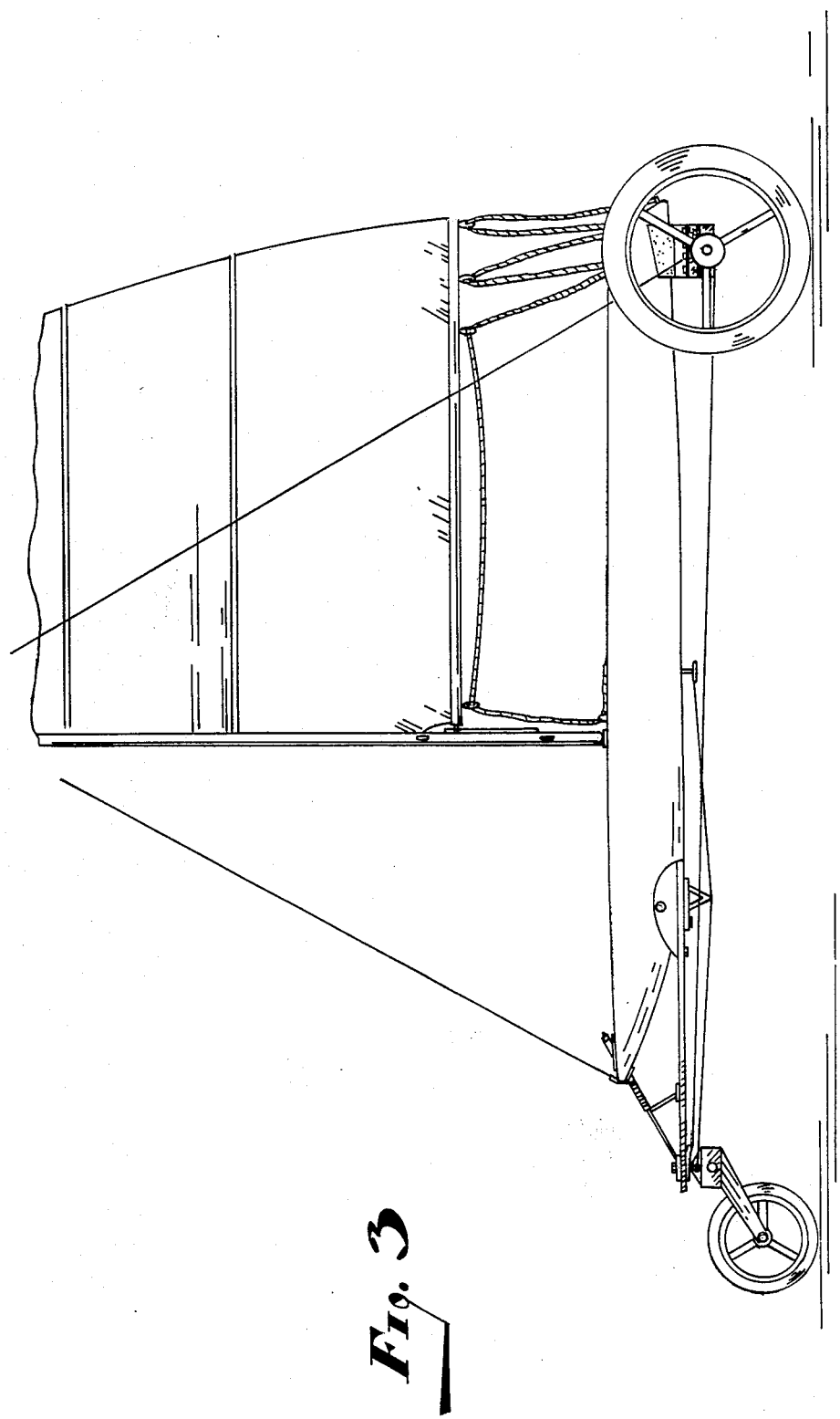
FIG. 3 is a side view showing the sailboat adapted for use on land.
Figure 4:
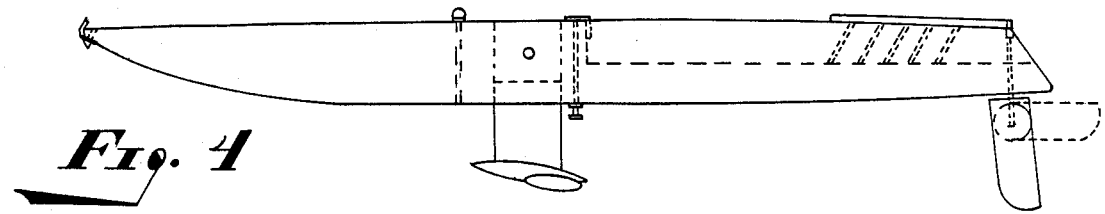
FIG. 4 is a side view that illustrates the centerboard member with the hydrofoil element deployed thereon and a rudder element pivoted upwardly to an alternative position as the sailboat is maneuvered in shallow water or put on a trailer.
Figure 5:
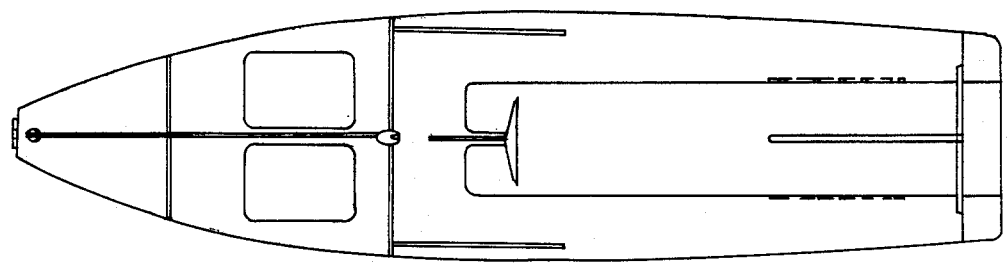
FIG. 5 is a top view showing a cockpit of the sailboat and illustrating a rearwardly projecting centerboard housing member that supports a steering means for the ice, show, or land boat.

Referring now to the drawing, sailboat 10 has sails 11, shrouds 11', tensioned from the upper reaches of a mastpole 58 at attachment 62, fore stay 56, and a monohull structure 12 that has a cockpit 14 contained therein. The sailboat is adapted for travel on land and on ice or snow by affixing a longitudinal support beam 30 and a transverse airfoil support member 48 as is illustrated in FIGS. 2 and 3.

Monohull structure 12 may be constructed of any suitable materials, but preferably is constructed of unidirectional, carbon fiber mat with resin. The monohull structure 12 has expansion foam in bow 17 and stern 19 for flotation. Within the stern 19 of the cockpit 14 a tiller member 16 is provided that has a downwardly projecting tiller element 18 on which a rudder element 20 is pivotably attached. Rudder element 20 pivots vertically upwardly as the vessel is beached maneuvered in shallow water or put on a trailer.

In a forward or frontal portion 17 of cockpit 14 a centerboard housing member 22 is integral with hull structure 12 and projects into the cavity formed by cockpit 14. A centerboard keel member 24 is slidably disposed, vertically, within centerboard housing member 22 and has a fastening means, such as laterally inserted pegs 23 to hold centerboard keel member 24 in a raised or a lower position with respect to the hull structure 12.

Centerboard keel member 24 has a hydrofoil element 26 disposed on the lower end thereof, hydrofoil element 26 being rigidly mounted transverse to the vertically oriented centerboard keel member 24. The hydrofoil element 26 is mounted on the lower reaches of the centerboard keel member 24.

In the raised or upper position, centerboard keel member presents less resistance to the flow of water around the centerboard 24 and further, as the hydrofoil element 26 is weighted for ballast, the center of gravity of the sailboat is lowered within the hull structure 12. As the centerboard keel member 24 is lowered, the center of gravity of the boat is lowered to provide greater stability as the boat heels to the wind, the lowered ballast represented by hydrofoil element 26 providing a righting arm or righting momentum to bring the vessel upright again and give added stability as the craft heels in a quickening breeze. The hydrofoil element 26 further enhances performance of the sailboat by its fluiddynamic cross-sectional shape as it is in outline an elliptical wing shape. Hydrofoil element 26 functions to provide a co-efficient of lift to the craft as it is underway in water.

Centerboard housing member 22 presents an upright vertical member 27 projecting inwardly to the cockpit 14, and defining an upright support element 27'. As centerboard housing member 24 is positioned substantially along a longitudinal axis of the vessel, vertical member 27 and it's facing surface 27' provides a mounting surface for a control means 28. This is a crossbrace 28 pivotably attached to mounting surface 27'. Steering wires 29 extend from the control means 28 to steering means, such as a steering head 31. A wire 29 is routed through guide means 29' that is mounted on the bottom of longitudinal support beam 30.

Figure 8:
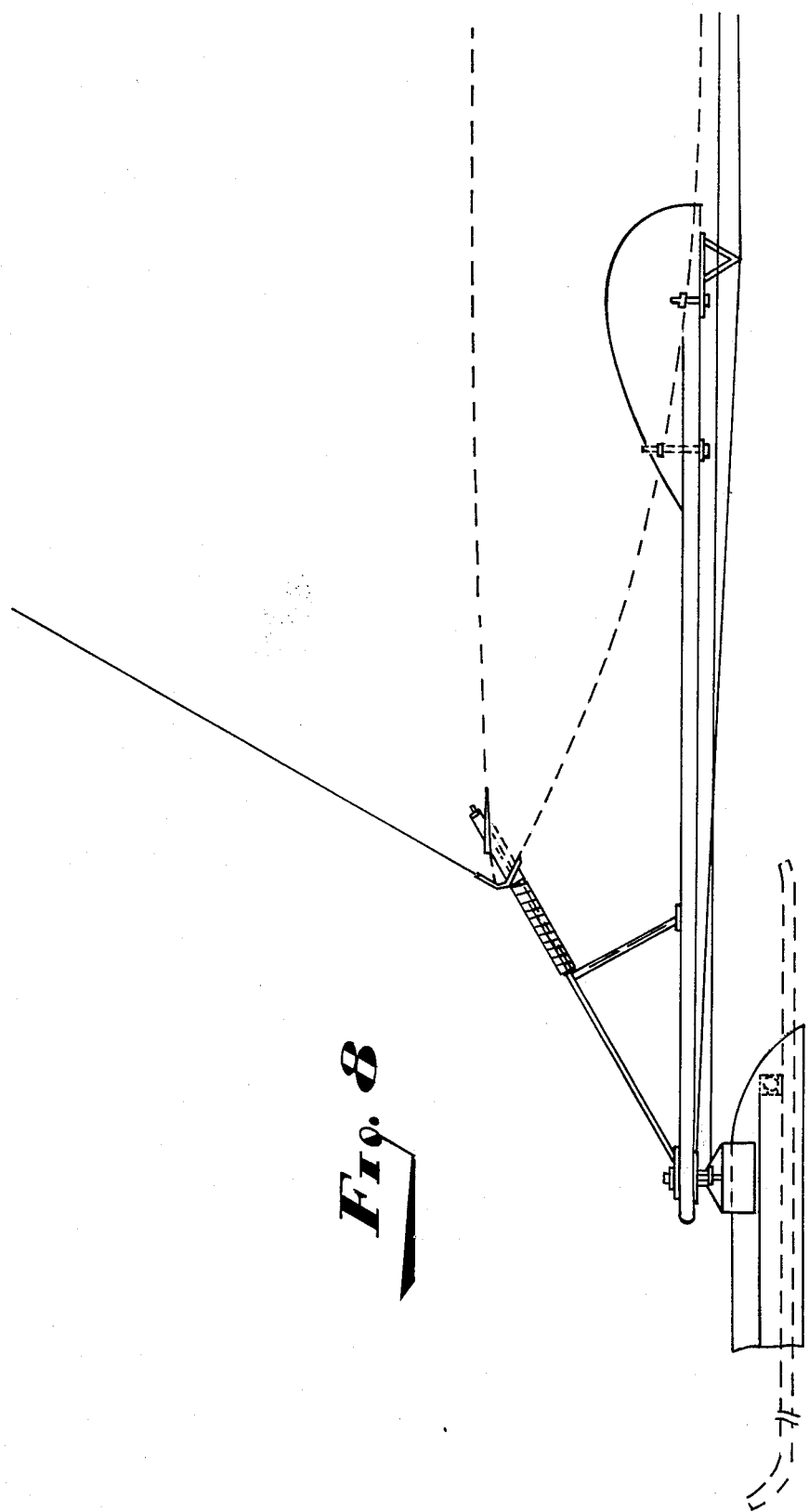
FIG. 8 is a side view of the bow portion of the sailboat illustrating a means of attaching the longitudinal support beam to the front of the boat.

Solid surface contact means that may be a skate member 32, ski element 62 or a wheel member 34 that is removably attached on the outer reaches of the longitudinal support beam 30. As shown in FIGS. 2, 3 and 8 the skate or ski element and wheel elements 32 and 34 are removably attached to longitudinal support beam 30 to complete the adaptation of the sailboat 10 to travel on ice, snow or land.

The mechanism of attachment of longitudinal support beam 30 to monohull structure 12 is a mating member 36 that has a pair of mating elements 36' and 36" that are folded or contoured upward to urge against monohull structure 12 right behind the bow. Fastening means 40 affixes longitudinal support beam 30 to monohull 12. Brace 42 stiffens fastening means 40, as shown in FIG. 8 to secure the longitudinal support beam 30 to the hull 12.

Longitudinal support beam 30 has a brace 44 extending from the outer reaches of longitudinal support beam 30 and engaging the bow sprit of hull structure 12; brace 44 having a compression spring 46 integral therewith to function as a shock absorber as the outer reaches of longitudinal support beam 30 are vibrated as the device moves over land, ice or snow.

Airfoil support member 48 is mounted under the stern portion of hull structure 12, being substantially mounted below the back portion of cockpit 14 and extends outwardly from hull structure 12; support member 48 having an aerodynamic shape in cross-section to facilitate airflow over the upper and lower surfaces 48' and 48" thereof to reduce parasitic drag on the craft 10 and also imparts a co-efficient of lift to the device 10 as it is in use in a land, ice or snow configuration.

As airfoil support member 48 is removed from monohull 12 plugs 51 are inserted into fastening tubes 50 to prevent water from entering up into the sailboat 10. The sailboat 10 has expanded foam, as indicated, in the stern and bow areas to provide positive buoyancy under all conditions.

Figure 6:
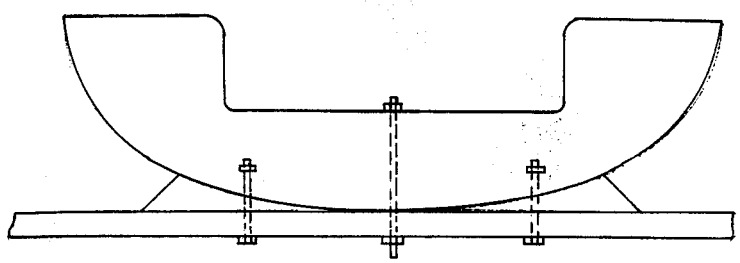
FIG. 6 is a rear view, showing by hidden line a method of fastening a airfoil support member to the stern of the sailboat as it is adapted for use on ice, snow or land.
Figure 7:
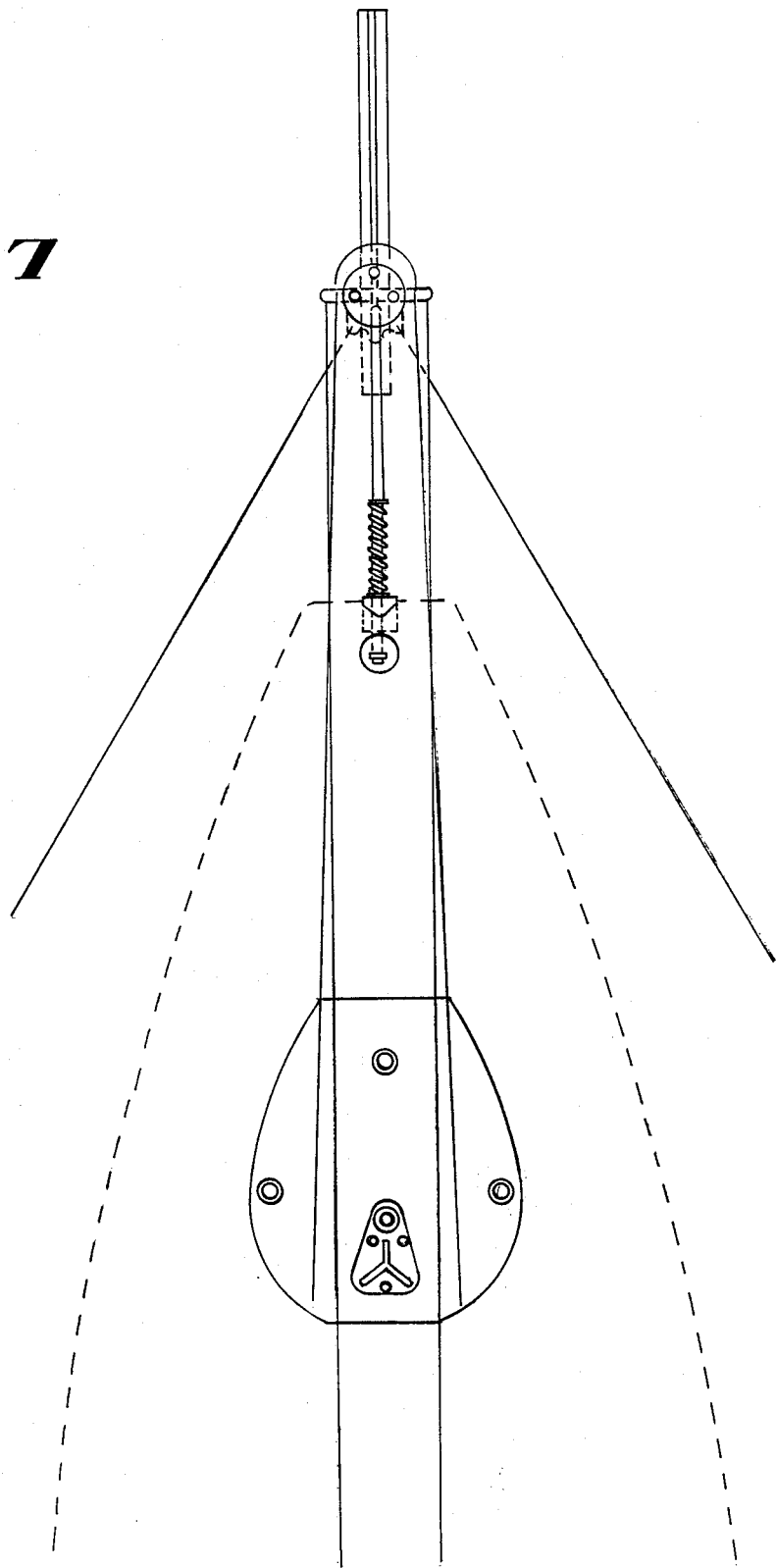
FIG. 7 is a top view of the bow portion of the sailboat showing a longitudinal support beam that is removably affixed to the bow of the sailboat and a means for the attachment thereof.

Alternatively, airfoil support member 48 mounts to hull structure 12 by fastening elements 50 that extend downwardly, at an angle as shown in FIG. 6, and provide a tubular or cylindrical enclosure that is open at the upper reaches so as to receive a fastener, such as a threaded bolt 52. Bolts 52 secures airfoil support member 48 to the hull structure 12 substantially as shown in FIG. 6.

The upwardly disposed fastening element 50 provides a water proof for securing the airfoil support member 48 inasmuch as water is displaced upward in the cylindrical elements, but the fastening elements 50 are designed to rise above the water level in the boat, the water level is contained within the cylindrical elements.

Hull support brace 54 is integral with airfoil support member 48 and functions to cradle or seat hull structure 12 therewithin and further functioning to align airfoil support member 48 along the longitudinal axis of the sailboat.

Shroud tension lines 11' further augment the orientation of the hull, sails, rigging and support members 30 and 48 as shown in FIGS. 2 and 3, by providing tension vertically toward the mastpole 58. The tension wires 60 extend between the outer reaches of the support members to further align and brace the support members 30 and 48 to maintain the ice, snow or wheel elements in their respective proper axis and orientation to increase speed by reducing a 'drag' co-efficient generated by the respective support member being slightly out of orientation with respect to each other and to the hull structure 12.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents, which may be resorted to, fall within the scope of the invention.

What is claimed is:

1. A multiple mode sail driven vehicle comprising:
   a hull having a bow and a stern;
   a mastpole extending upwardly from said hull with upper reaches adapted to hold rigging and sail means for driving said vehicle by wind;
   a rudder means for steering said hull when in water;
   means included on said hull for accomodating said hull for land, ice, and snow use;
   means also included within said hull for accomodating said hull for water use by making the hull react in the water to force of wind on said sail means;
   said means for accomodating said hull for land, ice and snow use including fastening means at the bow of said hull, fastening means at the stern of said hull and attachment means in the upper reaches of said mastpole;
   said attachment means including two shrouds extending abeam downward from said upper reaches of said mastpole;
   said means for accomodating said hull for land, ice and snow use also including a longitudinal support beam with one for ward outer reach and a transverse airfoil support member with two outer reaches having separable fastening means for holding said beam and said airfoil support member to said stern of said hull when in use, solid surface contact means on said outer reach of said longitudinal support beam and said outer reaches of said transverse airfoil support member;
   bolts adapted to hold said transverse airfoil support member to the stern of the hull when attached to the hull; and
   tubes in said hull wherein said bolts are adapted to extend into said tubes and said tubes extend above water level.

2. A multiple mode sail driven vehicle as in claim 1, wherein
   said rudder means includes a vertically pivotable rudder and a tiller coupled to said rudder.

3. A multiple mode sail driven vehicle as in claim 1 further comprising;
   a centerboard keel including means for lifting fluid-dynamically in water use and for giving momentum to the vehicle for stability when said vehicle heels in water use.

4. A multiple mode sail driven vehicle as in claim 1 further comprising;
   a hydrofoil element attached to the centerboard including ballast making said means for lifting and giving momentum.

5. A multiple mode sail driven vehicle as in claim 1, wherein;
   said shrouds extending abeam downward from said upper reaches of said mastpole also extend aft to the outer reaches of said airfoil support member abeam of said hull.

6. A multiple mode sail driven vehicle as in claim 1, wherein;
   said outer reaches of said longitudinal support beam and said airfoil support member are each adapted to hold a ski.

7. A multiple mode sail driven vehicle as in claim 1, wherein;
   said longitudinal support beam has a mating member with a pair of mating elements contoured upwardly abeam below the hull structure directly behind the bow.

8. A multiple mode sail driven vehicle as in claim 1 wherein;
   said longitudinal support beam has a brace extending from said forward reach for engagement with the bow of the hull, and shock absorbing means on said brace.

9. A multiple mode sail driven vehicle as in claim 1, wherein;
   said means for absorbing shock comprises a spring.

10. A multiple mode sail driven vehicle as in claim 1, wherein tension wires extend from said outer reaches of said transverse airfoil support member to the forward reach of said longitudinal support beam.

11. A multiple mode sail driven vehicle as in claim 1, wherein;
    said outer reaches of said longitudinal support beam and said outer reaches of said airfoil support member are each adapted to hold a skate.

12. A multiple mode sail driven vehicle as in claim 1, wherein;
    said outer reaches of said longitudinal support beam and airfoil support member and each adapted to hold a wheel.

13. A multiple mode sail driven vehicle comprising:
    a hull having a bow and a stern;
    a mastpole extending upwardly from said hull with upper reaches adapted to hold rigging and sail means for driving said vehicle by wind;
    rudder means for steering said hull when in water;
    means included on said hull for accomodating said hull for land, ice, and snow use;
    means also included within said hull for accomodating said hull for water use by making the hull react in the water to force of wind on said sail means;
    said means for accomodating said hull for land, ice and snow use including fastening means at the bow of said hull, fastening means at the stern of said hull and attachment means in the upper reaches of said mastpole;
    said attachment means including two shrouds extending abeam downward from said upper reaches of said mastpole;
    said means for accomodating said hull for land, ice and snow use also including a longitudinal support beam with one for ward outer reach and a transverse airfoil support member with two outer reaches having separable fastening means for holding said beam and said airfoil support member to said stern of said hull when in use, solid surface contact means on said outer reach of said longitudinal support beam and said outer reaches of said transverse airfoil support member;
    bolts adapted to hold said transverse airfoil support member to the stern of the hull when attached to the hull;
    tubes in said hull;
    said bolts adapted to extend into said tubes in said hull, and said tubes are adapted to be plugged with plugs to keep water out of said hull.

* * * * *